United States Patent
Aeshliman et al.

(10) Patent No.: US 8,601,866 B2
(45) Date of Patent: Dec. 10, 2013

(54) AIRCRAFT POTABLE WATER SYSTEM

(75) Inventors: Carl R. Aeshliman, Rittman, OH (US);
Jon D. Shearer, Hartville, OH (US);
John A. Harr, Minerva, OH (US)

(73) Assignee: Goodrich Corporation, Charlotte, NC (US)

( * ) Notice: Subject to any disclaimer, the term of this patent is extended or adjusted under 35 U.S.C. 154(b) by 630 days.

(21) Appl. No.: 12/696,515

(22) Filed: Jan. 29, 2010

(65) Prior Publication Data

US 2010/0231245 A1 Sep. 16, 2010

Related U.S. Application Data

(60) Provisional application No. 61/148,499, filed on Jan. 30, 2009.

(51) Int. Cl.
*G01F 23/26* (2006.01)

(52) U.S. Cl.
USPC .......................................... 73/304 C

(58) Field of Classification Search
USPC ............................. 73/304 C, 304 R
See application file for complete search history.

(56) References Cited

U.S. PATENT DOCUMENTS

| | | | |
|---|---|---|---|
| 2,233,297 A * | 2/1941 | Polin et al. .................. | 73/304 R |
| 3,498,131 A | 3/1970 | Rickey | |
| 3,739,405 A | 6/1973 | Schmidt | |
| 5,058,421 A | 10/1991 | Alexander et al. | |
| 5,108,663 A | 4/1992 | Chiu | |
| 5,295,465 A * | 3/1994 | Volmary et al. .......... | 123/406.57 |
| 5,487,359 A | 1/1996 | Montreul | |
| 5,493,277 A | 2/1996 | Pierce et al. | |
| 5,835,018 A | 11/1998 | Kursel et al. | |
| 5,921,267 A | 7/1999 | Lin | |
| 5,969,620 A | 10/1999 | Okulov | |
| 7,131,329 B2 * | 11/2006 | Eguchi et al. ............... | 73/304 R |
| 2008/0083235 A1 | 4/2008 | Wang | |
| 2009/0103904 A1 | 4/2009 | Wolff et al. | |
| 2009/0229683 A1 | 9/2009 | Baek et al. | |
| 2010/0084030 A1 | 4/2010 | Mackulin et al. | |
| 2010/0095446 A1 | 4/2010 | Schuster et al. | |

FOREIGN PATENT DOCUMENTS

JP 2004226242 8/2004

OTHER PUBLICATIONS

Translation of cover page of JP20044226242.
PCT/US2010/022538, Sep. 23, 2010, European Patent Office.

* cited by examiner

*Primary Examiner* — Peter Macchiarolo
*Assistant Examiner* — Tamiko Bellamy
(74) *Attorney, Agent, or Firm* — Cantor Colburn LLP

(57) ABSTRACT

A sensing device (10) is provided for sensing whether an electrically-conductive fluid (14) has reached a predetermined level within a container (12). In this device (10), a first electrode (22) is electrically connected to a source (20) and a second electrode (24) is electrically connected to ground. When the electrode gap (26) is filled with the fluid (14), the sensing circuitry causes the electrodes (22, 24) to switch roles as the anode depending upon whether a positive voltage pulse or negative voltage pulse is being received from the source (20).

11 Claims, 3 Drawing Sheets

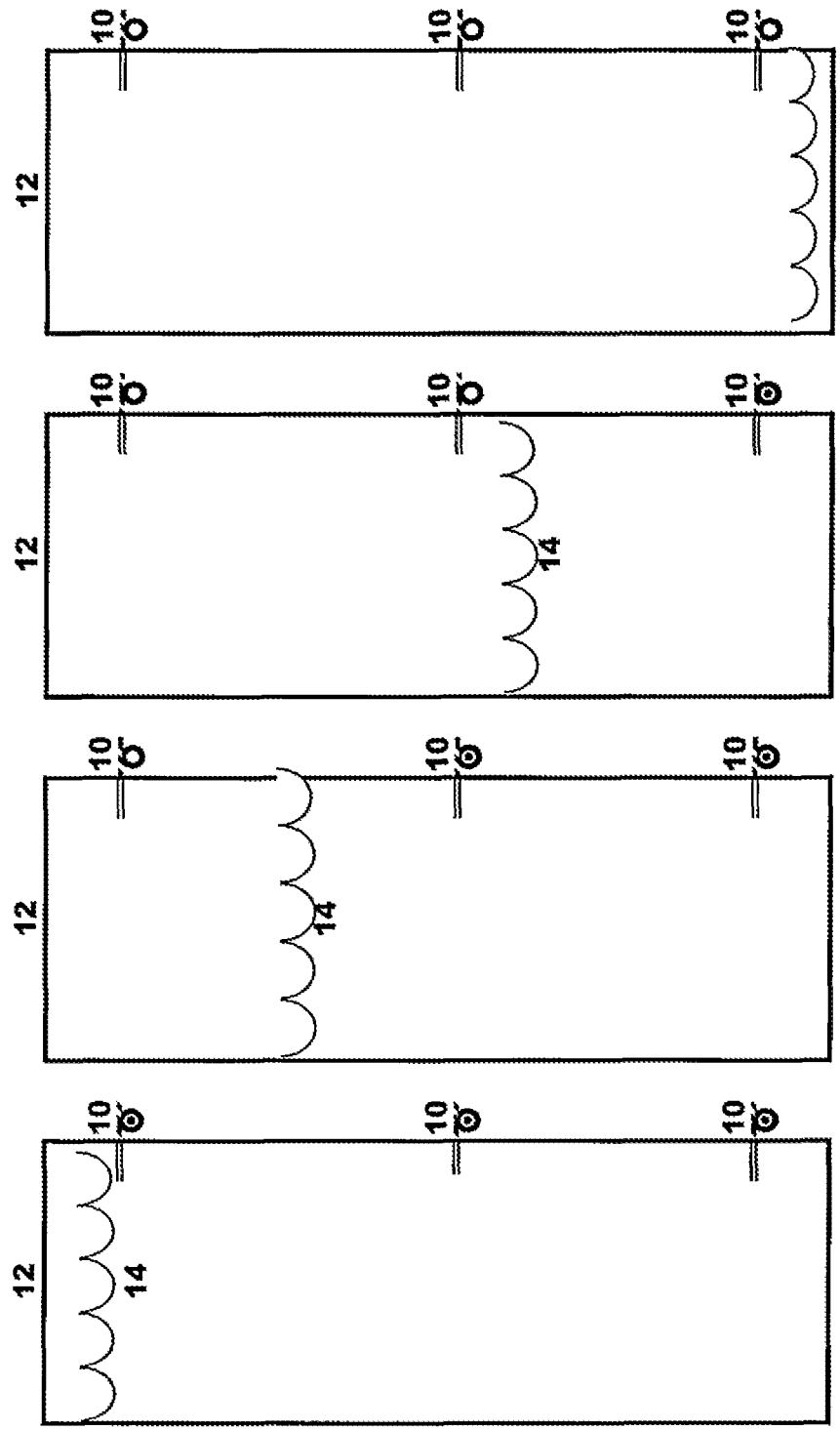

AIRCRAFT POTABLE WATER SYSTEM

RELATED APPLICATION

This application claims priority under 35 U.S.C. §119(e) to U.S. Provisional Patent Application No. 61/148,499 filed on Jan. 30, 2009. The entire disclosure of this application is hereby incorporated by reference. To the extent that inconsistencies may occur between the present application and the incorporated application, the present application governs interpretation to the extent necessary to avoid indefiniteness and/or clarity issues.

BACKGROUND

An aircraft can include a potable water system having, among other things, a water storage container (e.g., a tank). While the exact amount of water within such a container is usually not important, it is often necessary (or at least helpful) to have a generally indication of its current capacity. To this end, sensing devices can be installed to sense when the water level reaches, for example, a level corresponding to its full capacity, a level corresponding to its empty capacity, and/or a level corresponding to an intermediate capacity (e.g., half-full).

SUMMARY

A sensing device is provided for sensing whether an electrically-conductive fluid (e.g., water) has reached a predetermined level within a container. When the container is filled to or beyond the predetermined level, the fluid occupies a gap between a pair of electrodes. The sensing device includes circuitry causing the electrodes to continuously switch "anode" and "cathode" roles depending upon whether a positive voltage pulse or a negative voltage pulse is being received. This feature greatly diminishes electrolytic corrosive effects as compared to, for example, liquid-detection devices wherein the same electrode always performs the "anode" role.

DRAWINGS

FIGS. 1A-1D are each a schematic view of a container having a series of sensing devices for sensing whether fluid has reached certain levels.

DESCRIPTION

Figure 2A:
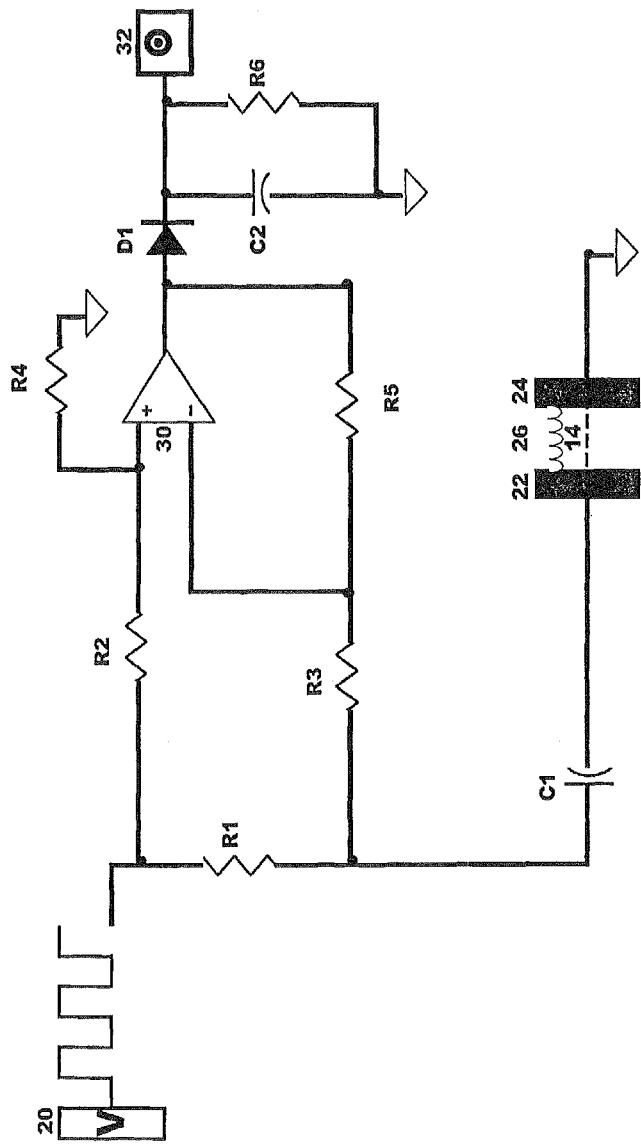
FIGS. 2A and 2B are each a schematic depiction of the sensing device, FIG. 2A showing when fluid has reached the predetermined level and FIG. 2B showing when it has not.

Referring now to the drawings, and initially to FIGS. 1A-1D, a series of sensing devices 10 are shown installed on a container 12 holding an electrically-conductive fluid 14 (e.g., water). The container 12 could be, for example, a water storage tank in an aircraft's potable water system.

In the illustrated embodiment, three sensing devices 10 are installed to sense when water level reaches (and/or exceeds) certain predetermined levels. These predetermined levels can include a level corresponding to the container's full capacity (e.g., at or near its top), a level corresponding to the container's empty capacity (e.g., at or near its bottom), and a level corresponding to an intermediate capacity (e.g., halfway between its top and bottom). Depending upon a particular, it may be more appropriate to have less (e.g., only one or two) or more sensing devices 10. For example, if it is only necessary to know when a container 12 is approaching emptiness, one sensing device 10 may suffice. On the other hand, if a more precise indication of fluid level is necessary, more devices 10 can be installed at reflecting intervals (e.g., every inch, every centimeter, etc.).

Figure 2B:
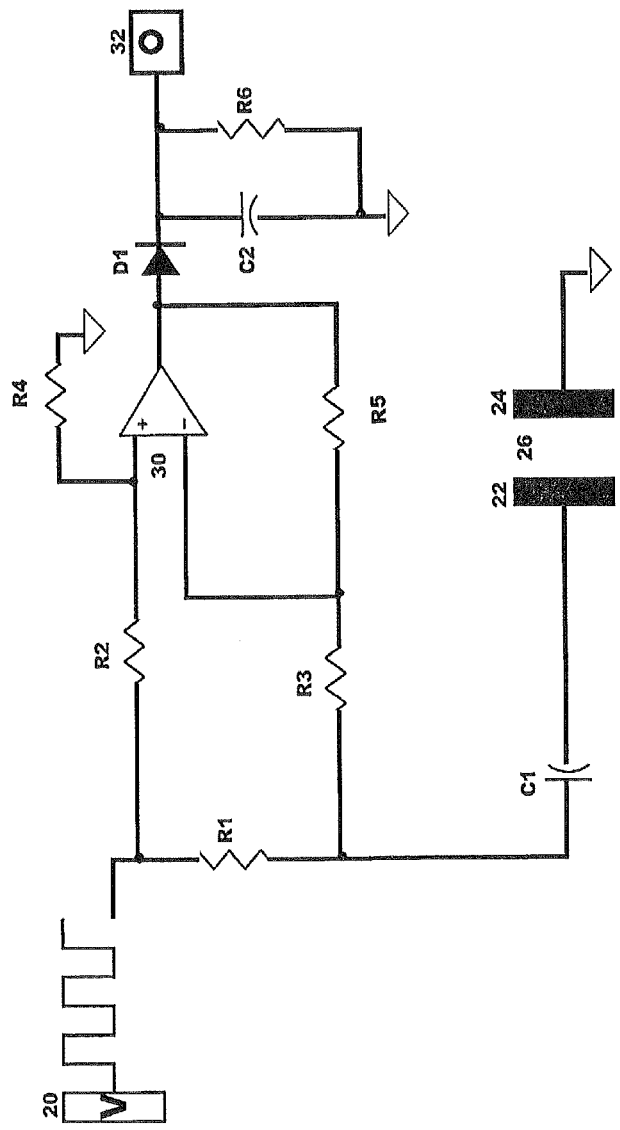

One sensing device 10 is shown schematically in FIGS. 2A-2B. The sensing device 10 can be powered by a voltage source 20 supplying alternating positive and negative pulses. On an aircraft, for example, this could be accomplished by using an oscillator or microprocessor to pulse voltage supplied by an onboard generator. In any event, a first electrode 22 is electrically connected to the voltage source 20 and a second electrode 24 is electrically connected to ground. With a metal tank, for example, the second electrode 24 can be the container 12 itself (or an integral part thereof).

The electrodes 22 and 24 are separated by a gap 26. The gap 26 is filled with the fluid 14 when it reaches the predetermined level in the container 12 and a circuit path is formed therebetween. (See FIG. 2A.) When the container's level is below the predetermined mark, the fluid 14 does not occupy the gap 26, and a circuit path is not formed between the electrodes 22 and 24. (See FIG. 2B.)

The sensing device 10 includes circuitry causing the electrodes 24 and 26 to continuously switch "anode" and "cathode" roles depending upon whether a positive voltage pulse or a negative voltage pulse is being received. The circuitry generally comprises a limiting resistor R1 and a capacitor C1 in series between the source 20 and the first electrode 22. Amplifying means (e.g., an amplifier 30 and scaling resistors R2-R5) are provided for amplification of the voltage across resistor R1. A diode D1, a capacitor C2, and a resistor R6 are associated with an output 32.

When fluid 14 fills the gap 26 and the first electrode 22 is receiving a positive voltage pulse from source 20, current flows from the first electrode 22 to the second electrode 24. (Thus the first electrode 22 acts as the anode.) When fluid 14 fills the gap 26 and the first electrode 22 is receiving a positive voltage pulse from the source 20, current flows from the second electrode 24 to the first electrode 22. (Thus the second electrode acts as the anode.) Diode D1 ensures that capacitor C2 does not lose its charge during negative cycles. In any event, the same "level reached" output 32 (e.g., high logic) occurs regardless of pulse polarity.

When fluid 14 does not fill the gap 26, there is an open circuit between the source 20 and ground, whereby there is no voltage across resistor R1 (and thus nothing to amplify). A "level not reached" output 32 occurs. Or to put it another way, the "level reached" output does not occur.

Although the sensing device 10, the container 12, and/or the circuitry has been shown and described with respect to a certain embodiments, equivalent alterations and modifications should occur to others skilled in the art upon review of this specification and drawings. If an element (e.g., component, assembly, system, device, composition, method, process, step, means, etc.), has been described as performing a particular function or functions, this element corresponds to any functional equivalent (i.e., any element performing the same or equivalent function) thereof, regardless of whether it is structurally equivalent thereto. And while a particular feature may have been described with respect to less than all of embodiments, such feature can be combined with one or more other features of the other embodiments.

The invention claimed is:

1. A sensing device for sensing whether an electrically-conductive fluid has reached a predetermined level within a container, said sensing device comprising:

a first electrode that is electrically connected to a source of alternating positive and negative pulses;

a second electrode that is electrically connected to ground;

a gap between the first electrode and the second electrode, this gap being filled with the fluid when it reaches the predetermined level in the container, but not when the fluid is below this predetermined level;

circuitry causing current flow from the first electrode to the second electrode when gap is filled with the fluid and the first electrode is receiving one of a positive voltage pulse or a negative voltage pulse from the source, and causing current flow from the second electrode to the first electrode when the gap is filled with the fluid and the first electrode is receiving the other of a positive voltage pulse or a negative voltage pulse from the source;

wherein the circuitry comprises:
- a capacitor (C2) that charges during positive voltage pulses and a resistor (R6) that ensures that the capacitor (C2) discharges when the gap is not filled with fluid; and
- a diode (D1) that insures that the capacitor (C2) does not drain during negative voltage pulses.

2. A sensing device as in claim 1, wherein the circuitry causes current flow from the first electrode to the second electrode when the fluid fills the gap and the first electrode is receiving a positive voltage pulse and causes current flow from the second electrode to the first electrode when the fluid fills the gap and the first electrode is receiving a negative voltage pulse.

3. A sensing device as set forth in claim 1, wherein the circuitry provides an output indicative of whether the gap is filled with the fluid.

4. A sensing device as set forth in claim 3, wherein the circuitry provides the same output regardless of whether the first electrode is receiving a positive voltage pulse or a negative voltage pulse.

5. A sensing device as set forth in claim 4, wherein the circuitry provides a high logic output if the gap is filled with the fluid, and wherein the circuitry does not provide a high logic output if the gap is not filled with the fluid.

6. A sensing device as set forth in claim 1, wherein the voltage-amplifying means comprises an operational amplifier and/or scaling resistors.

7. A sensing device for sensing whether an electrically-conductive fluid has reached a predetermined level within a container, said sensing device comprising:

a first electrode that is electrically connected to a source of alternating positive and negative pulses;

a second electrode that is electrically connected to ground;

a gap between the first electrode and the second electrode, this gap being filled with the fluid it reaches the predetermined level in the container, but not when the fluid is below this predetermined level;

circuitry causing current flow from the first electrode to the second electrode when gap is filled with the fluid and the first electrode is receiving one of a positive voltage pulse or a negative voltage pulse from the source, and causing current flow from the second electrode to the first electrode when the gap is filled with the fluid and the first electrode is receiving the other of a positive voltage pulse or a negative voltage pulse from the source;

wherein the circuitry comprises:
- a limiting resistor (R1) connected in series between the source and the first electrode;
- a capacitor (C1) connected in series between the source and the first electrode, the capacitor (C1) being situated between the first electrode and the limiting resistor (R1);
- means for amplifying the voltage across the limiting resistor (R1);
- a capacitor (C2) that charges during positive voltage pulses;
- a diode (D1) that insures that the capacitor (C2) does not drain during negative voltage pulses; and
- a resistor (R6) that ensures that the capacitor (C2) discharges when the gap is not filled with fluid.

8. A sensing device as set forth in claim 7, and a source of alternating positive and negative pulses.

9. A sensing device and a source as set forth in claim 8, wherein the source comprises an aircraft DC generator.

10. A container for an electrically conductive fluid, and the sensing device set forth in claim 7 for sensing whether the fluid has reached a predetermined level in the container.

11. A container as set forth in claim 10, wherein the predetermined level corresponds to a full capacity or corresponds to an empty capacity.

* * * * *